United States Patent [19]

Mayer

[11] 4,178,651
[45] Dec. 18, 1979

[54] WIPING ARRANGEMENT FOR A VEHICLE WINDOW

[75] Inventor: Jürgen Mayer, Gaggenau, Fed. Rep. of Germany

[73] Assignee: Robert Bosch GmbH, Stuttgart, Fed. Rep. of Germany

[21] Appl. No.: 927,536

[22] Filed: Jul. 24, 1978

[30] Foreign Application Priority Data

Aug. 6, 1977 [DE] Fed. Rep. of Germany ....... 2735627

[51] Int. Cl.$^2$ ............................................. B60S 1/40
[52] U.S. Cl. .................................. 15/250.32; 403/325
[58] Field of Search ...................... 15/250.31–250.35, 15/250.42; 403/325, 379

[56] References Cited

U.S. PATENT DOCUMENTS

| 2,560,780 | 7/1951 | Sacchini | 15/250.32 X |
| 3,378,874 | 4/1968 | Scinta | 15/250.32 |
| 3,866,259 | 2/1975 | Nichols et al. | 15/250.32 |

FOREIGN PATENT DOCUMENTS

| 1924879 | 11/1969 | Fed. Rep. of Germany | 15/250.32 |
| 2337173 | 2/1975 | Fed. Rep. of Germany | 15/250.32 |

Primary Examiner—Peter Feldman
Attorney, Agent, or Firm—Michael J. Striker

[57] ABSTRACT

A wiping arrangement for a vehicle window has a wiping blade element, a support element, an axle insertable into the elements so as to pivotally connect them with one another, and a substantially V-shaped spring member having a central portion surrounding the axle and two diverging legs located at opposite sides of the latter. The legs of the spring member extends through holes of one of the elements and outwardly beyond the latter, and are biased to the element so as to be retained under the spring action of the spring member. The spring member is movable between one position in which it engages the axle and retains the same in a position in which the axle is inserted into the elements, and another position in which the spring member is disengaged from the axle so that the latter can be withdrawn from the elements to thereby disconnect the latter from one another.

19 Claims, 8 Drawing Figures

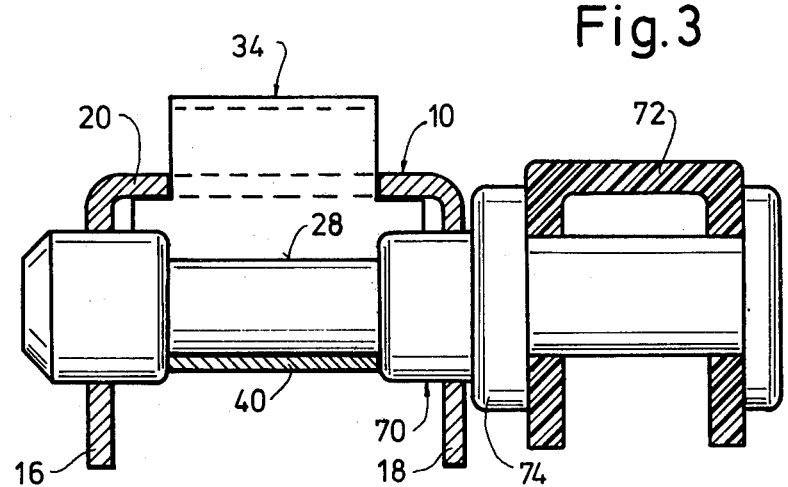
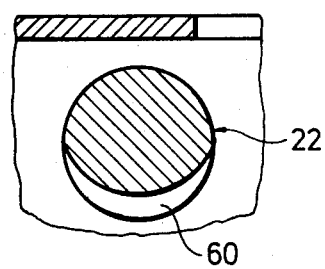
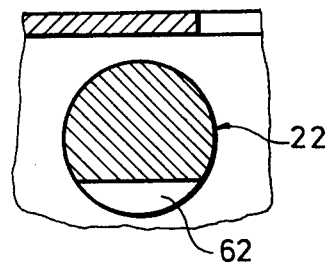
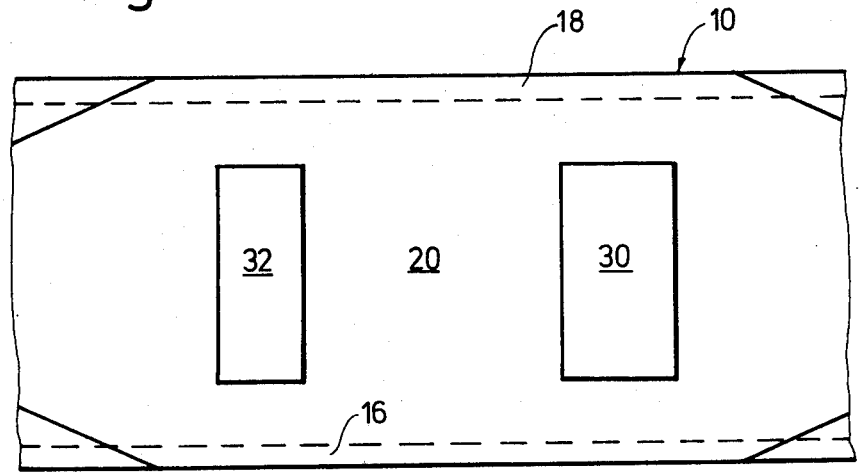

WIPING ARRANGEMENT FOR A VEHICLE WINDOW

BACKGROUND OF THE INVENTION

The present invention relates to a wiping arrangement for a vehicle window.

Wiping arrangements for vehicle windows have been proposed in the art, which wiping arrangement includes a wiping blade having a holding portion and a retaining spring. One leg of the spring is correspondingly bent so as to abut against an inner surface of a web of a holding portion of the wiping element, and is riveted to the holding portion. A thrust bolt extends through the web of the holding portion and rests upon another free leg of the spring. The spring can be so pivoted under the action of the thrust bolt that an axle or pivot of the arrangement can be brought into its operational position or withdrawn from the latter. The above described conventional arrangement is expensive to assemble and requires the utilization of both the mounting rivets for the spring and the thrust bolts.

SUMMARY OF THE INVENTION

Accordingly, it is an object of the present invention to provide a wiping arrangement for a vehicle window which avoids the disadvantages of the prior art.

More particularly, it is an object of the present invention to provide a wiping arrangement for a vehicle window, which, besides a stop spring, requires no further parts for mounting the spring or auxiliary means for actuating the latter.

In keeping with these objects and with others which will become apparent hereinafter, one feature of the present invention resides, briefly stated, in a wiping arrangement which has a wiping blade element, a support element, an axle which can be inserted into these elements so as to pivotally connect the latter with one another and withdrawn from the same so that these elements can be disconnected from one another, and a V-shaped spring member which has a central portion surrounding the axle and two diverging legs extending through holes provided in one of these elements so that the spring member is biased to the one element and retained under the spring action of the spring member. The spring member is movable between one position in which it engages the axle so as to retain the same in its inserted position, and another position in which the spring member is disengaged from the axle so that the latter can be withdrawn from the elements to thereby disconnect these elements from one another.

When a wiping arrangement is constructed in accordance with the present invention, only the spring member is required for retaining the elements of the arrangement in engagement with one another. No means for mounting or connecting the spring member to other parts of the arrangement and urging the spring member into corresponding positions thereof are needed.

In accordance with another feature of the present invention, one of the elements is U-shaped and has two side walls and a web which connects the side walls with one another and together with the side walls bounds a hollow. In such a construction the axle may be located substantially in the hollow of the one element and extend through the side walls of the latter. The spring member may be also located substantially in the hollow of the one element and may engage a surface of the axle which faces away from the web of the one element.

Still another feature of the present invention is that the holes through which the legs of the spring member extend may be provided in the web of the one element. Each leg must have an end portion which extends outwardly beyond the web of the one element.

It is a further feature of the present invention that the end portions of the legs of the spring member have a width which is smaller than that of the remainder portion of the spring member so that a shoulder is formed between each of the end portions and the remainder portion of the spring member. The end portions of the legs of the spring member may have outer sections which are located outwardly beyond the one element and bent in a direction away of the axle. The outer sections may have inner surfaces which face toward the web of the one element.

Still a further feature of the present invention is that the dimension between the inner surface of the outer portion of one of the legs of the spring member and the shoulder formed on this one leg is insignificantly greater than the thickness of the web of the one element. At the same time, the dimension between the inner surface of the outer portion of the other leg of the spring member and the shoulder formed on this other leg is greater than the thickness of the web of the one element plus the depth of a portion of the axle having a reduced cross-section.

An additional feature of the present invention is that the portion of the axle having a reduced cross-section is formed by a groove in which the spring member engages. The groove may be annular and extend about the peripheral surface of the axle. On the other hand, the groove may be provided only on a part of the surface which faces away from the web of the one element.

Still an additional feature of the present invention is that the groove has a width which is smaller than the distance between inner surfaces of the side walls of the U-shaped one element.

The spring member may have a central portion whose shape corresponds to the shape of the groove formed in the axle.

The U-shaped element may be formed by a holding portion provided in the wiping blade element. On the other hand, the U-shaped element may be formed by a support element of the arrangement. When the U-shaped element is the holding portion of the wiping blade, the axle may be fixedly connected to the support element. The latter may be connected to a wiper arm, or may be formed as a wiper arm itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a section substantially corresponding to that of shown in FIG. 2, but showing the wiper arm and the wiping blade which are located laterally adjacent to one another;

FIGS. 4a and 4b are sections of an axle of the arrangement in accordance with two different embodiments both differing from that shown in FIG. 1;

FIG. 5 is a plan view of the holding member of the wiping blade shown in FIG. 1;

DESCRIPTION OF THE PREFERRED EMBODIMENTS

A wiping arrangement for a vehicle window in accordance with the present invention has a holding element 10 of a not shown wiping blade, and an intermediate element 12 having a passage 14 for receiving therein a not shown wiper arm. The holding element 10 and the intermediate element 12 are pivotally connected with one another.

Figure 2:
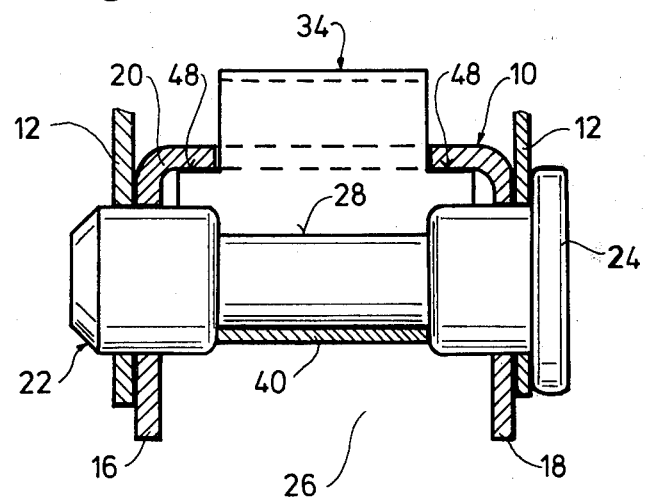
FIG. 2 is a partial section taken along line II—II of FIG. 1.

The holding element 10, as particularly shown in FIG. 2, have a U-shaped cross-section. It has two substantially parallel side walls 16 and 18 which are connected with one another by a web 20. An axle or pivot 22 extends through the side walls 16 and 18 at a distance from the web 20 and is supported by the side walls. The axle 22 has an end portion provided with a head 24. The axle 22 has an annular groove 28 which is formed in a hollow 26 bounded between the side walls 16 and 18 and the web 20 of the holding element 10. The web 20 of the holding element 10 is provided with two holes 30 and 32 which are located at opposite sides of the axle 22, as can be also seen from FIG. 5.

A substantially V-shaped spring member or stop spring 34 is located in the hollow 26 and is so arranged that its legs 36 and 38 extends through the holes 30 and 32 and at a surface of the web 20 which faces away from the hollow 26. The spring is also so arranged that its central portion 40 engages in the annular groove 28 at a side of the axle 22 which faces away from the web 20 of the holding element 10. The spring 34 is inserted into the holes 30 and 32 with such prestress that the legs 36 and 38 of the spring member 34 are biased toward opposite walls with the force of the prestress of the spring member. Due to the special V-shaped construction of the spring member 34, the central portion 40 of the spring member 34 under the action of the force of prestress is urged toward the web 20 of the holding element 10 in a direction opposite to the arrow 56 in FIG. 1. Thereby, the central portion 40 of the spring 34 engages into the annular groove 28 of the axle 22 so that the latter is secured against axial withdrawal from the holding element 10 and the intermediate element 12.

Figure 6:
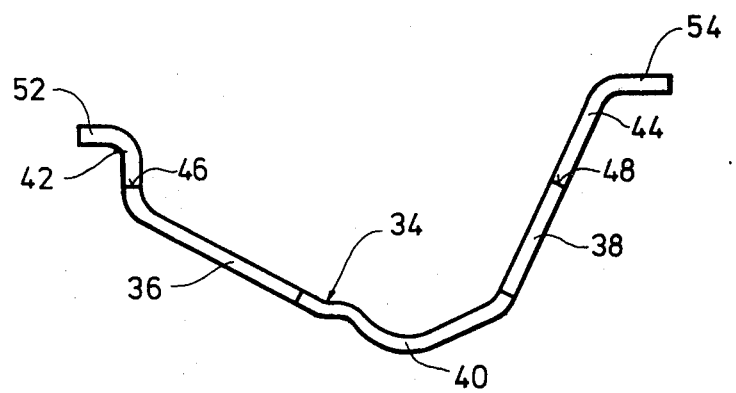
FIG. 6 is a side view of the spring member.
Figure 7:
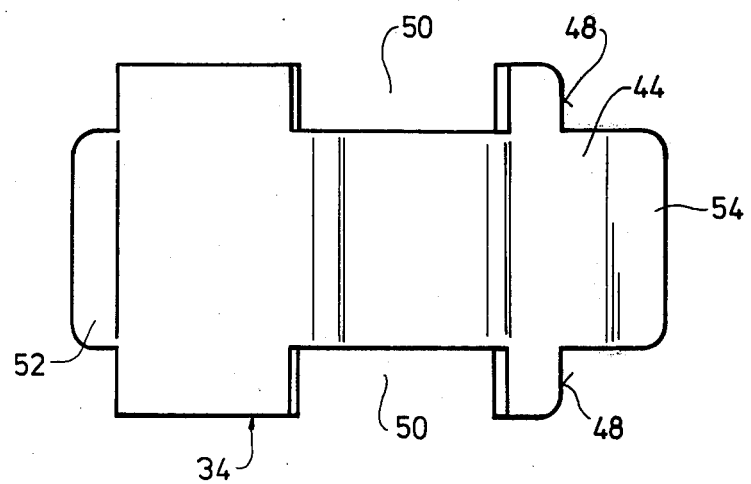
FIG. 7 is a plan view of the spring member.

The construction of the spring member 34 is shown in FIGS. 6 and 7. As can be seen particularly from FIG. 7, the spring member 34 is constituted by a sheet steel spring. The legs 36 and 38 have end portions 42 and 44 which extend through the holes 30 and 32 of the web 20 of the holding element 10. The end portions 42 and 44 have a width which is smaller than that of the remainder portion of the spring 34 so as to form shoulders 46 and 48, respectively. The spring 34 has two recesses 50 which are located opposite to one another and between the shoulders 46 and 48. The recesses 50 reduce the width of the spring member 34 so that the thus-reduced width substantially corresponds to the width of the annular groove 28 of the axle 22. The central portion 40 formed in this region and having a width corresponding to that of the annular groove 28, is curved in accordance with the radius of a base surface of the annular groove 28.

Figure 1:
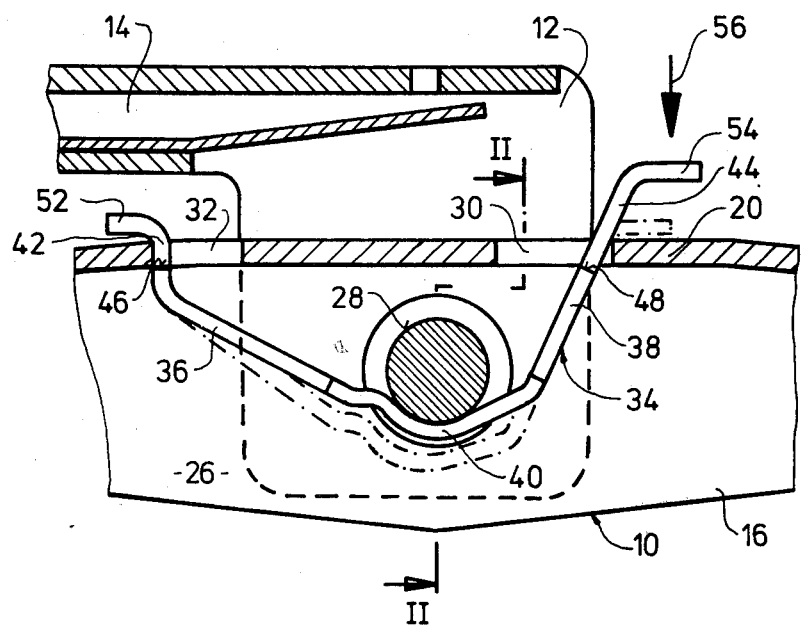
FIG. 1 is a section showing a holding member of a wiping blade which is pivotally connected with an intermediate member for mounting a wiper arm, and a spring member.

As can be seen from FIGS. 1 and 6, the end portions 42 and 44 of the legs 36 and 38 have outer sections 52 and 54 which extend in opposite directions as considered relative to the axle 22. The outer sections 52 and 54 have inner surfaces facing toward the web 20 of the holding element 10. The dimension between the inner surface of the outer section 52 and the shoulder 46 located in the hollow 26 between the side walls 16 and 18 is insignificantly greater than the thickness of the web 20 which connects the side walls 16 and 18 with one another. Thereby, the spring member 34 can be undetachably retained on the web 20. On the other hand, the dimension between the inner surface of the outer section 54 of the leg 38 and the shoulder 48 located in the hollow 26 between the side walls 16 and 18 is greater than the thickness of the web 20 connecting the side walls 16 and 18 with one another plus the depth of the annular groove 28 in which the spring 34 is engaged.

FIGS. 4a and 4b shows the axle 22 in accordance with two further embodiments of the present invention. More particularly, this Figures shows the region of the axle 22 in which the latter is engaged with the central portion 40 of the spring member 34. As shown in FIG. 4a, the reduction of the cross-section of the axle 2 can be attained by an opening 60 which is located eccentrically relative to the axis of the axle 22. As shown in FIG. 4b, the reduction of the cross-section of the axle 22 can be attained by partial flattening 62 of the latter.

When the intermediate element 12 which is connected with the holding element 10 by means of the axle 22 must be disconnected from the holding element 10 the outer section 54 of the spring member 34 must be urged in the direction of the arrow 56. The spring member 34 will assume a position which is shown in dotted line in FIG. 1. This is possible inasmuch as the bent end portion 42 and the shoulder 46 in the region of the hole 32 are arrested, whereas the bent end 44 and more particularly the outer section 54 is located relative to the web 20 with such a play that under the action of the force applied in the direction of the arrow 56 the central portion 40 of the spring member 34 is fully withdrawn from the annular groove 28 of the axle 22. After this, the axle 22 can be axially withdrawn by moving the same in the direction of the head 24 out of the elements 10 and 12.

The mounting of the intermediate element 12 on the holding element 10 is performed in the reverse order. The intermediate element 12 of the wiper arm and the holding element 10 of the wiper blade must be first so located relative to one another that their openings through which the axle 22 extends are in alignment with each other. After this, the outer section 54 of the spring member 34 is urged in the direction of the arrow 56 so that the spring member 34 assumes its position shown in dotted line. Then, the axle 22 is inserted into the openings of the intermediate element 12 and holding element 10 and after this the central portion 40 of the spring member 34 springs back into the annular groove 28 of the axle 22.

The above described construction may also be modified by connecting the axle with the wiper arm. As shown in FIG. 3, an axle 70 is riveted to a wiper arm 72. Instead of the head 24 of the above-described embodiment, the axle 70 has a collar 74 located between the wiper arm and the holding element 10 of the wiping blade. The collar 74 permits the rivet connection of the axle 70 with the wiper arm 72.

It is also possible to arrest the axle in the holding portion of the wiper blade which is shown in FIGS. 1, 2, 5, 6 and 7, instead of mounting the axle on the wiper arm as shaw as FIG. 3. It is to be understood that the axle can be mounted or arrested in both elements to be connected with one another, that is in the holding element of the wiping blade and the wiper arm, as described hereinabove. It is assumed in this case that these elements have a U-shaped cross-section.

It will be understood that each of the elements described above, or two or more together, may also find a useful application in other types of constructions differing from the types described above.

While the invention has been illustrated and described as embodied in a wiping arrangement for a vehicle window, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiping arrangement for a vehicle window, comprising a wiping blade element; a support element, one of said elements being U-shaped and having two side walls and a web which connects said side walls with one another and together with said side walls bounds a hollow, said web of said one element being provided with two holes spaced from one another; an axle movable between a first position in which it extends through said elements so as to pivotally connect the latter with one another, and a second position in which it is withdrawn from said elements so that the latter can be disconnected from one another; and a substantially V-shaped spring member having a central portion surrounding said axle and two diverging legs located at opposite sides of the latter, said legs of said spring member extending through said holes outwardly beyond said one element and being biased to said one element so as to be retained under the spring action of said spring member, said spring member being movable between one position in which it engages said axle so as to retain the same in said first position thereof for connecting said elements with one another, and another position in which said spring member is disengaged from said axle so that the latter can be moved into its second position for disconnecting said elements from one another, each of said legs of said spring member having an end portion which extends outwardly beyond said web of said one element and through said holes and has a width which is smaller than that of the remainder portion of said spring member so that a shoulder is formed between each of said end portions and the remainder portion of said spring member, each of said end portions of said legs of said spring member having an outer section located outwardly beyond said web of said one element and bent in a direction away from said axle so that said web of said one element is clamped between the outer portion and the shoulder of one of said legs of said spring member whereby said spring member is retained by said one element.

2. A wiping arrangement as defined in claim 1, wherein said side walls have openings through which said axle extends.

3. A wiping arrangement as defined in claim 1, wherein said axle is located substantially in said hollow of said one element.

4. A wiping arrangement as defined in claim 1, wherein said axle has a surface which faces away from said web of said one element, said spring member being located substantially in said hollow of said one element and engaging said surface of said axle in said one position thereof.

5. A wiping arrangement as defined in claim 4, wherein said axle has a portion of a reduced cross section on which part of said surface is formed, said spring member engaging said reduced portion of said axle in said one position thereof.

6. A wiping arrangement as defined in claim 1, wherein said spring member is constituted by spring steel.

7. A wiping arrangement is defined in claim 1, wherein each of said outer sections of said end portions of said spring member has an inner surface facing toward said web of said one element, and said web has a predetermined thickness, the dimension between the inner surface of the outer portion of said one leg and the shoulder formed on said one leg being insignificantly greater than said predetermined thickness of said web.

8. A wiping arrangement as defined in claim 5, wherein said portion of a reduced cross section is formed by a groove provided in said axle, in which groove said spring member engages in said one position.

9. A wiping arrangement as defined in claim 8, wherein said axle has a peripheral surface, said groove being annular and extending about said peripheral surface of said axle.

10. A wiping arrangement as defined in claim 8, wherein said axle has a surface which faces away from said web of said one element, said groove being formed on said surface of said axle.

11. A wiping arrangement as defined in claim 8, wherein said side walls of said one element have inner surfaces which face toward one another and are spaced from one another by a predetermined distance, said groove having a width which is smaller than said predetermined distance.

12. A wiping arrangement as defined in claim 8, wherein said groove has a predetermined shape, said central portion of said spring member having a shape which corresponds to the shape of said groove.

13. A wiping arrangement as defined in claim 2, wherein said wiping blade element has a holding portion forming said one element.

14. A wiping arrangement as defined in claim 13, wherein said axle is fixedly connected to said support element.

15. A wiping arrangement as defined in claim 2, wherein said support element forms said one element.

16. A wiping arrangement as defined in claim 2, wherein said wiping blade element has a holding portion which forms said one element, said axle extending through said support element and said holding portion of said wiping blade element so as to pivotally connect said elements with one another.

17. A wiping arrangement as defined in claim 1, wherein said support element is a wiper arm.

18. A wiping arrangement is defined in claim 1, wherein said arrangement has a wiper arm, and said support element is connectable to said wiper arm.

19. A wiping arrangement for a vehicle window, comprising a wiping blade element; a support element, one of said elements being U-shaped and having two side walls and a web which connects said side walls with one another and together with said side walls bounds a hollow, said web having a predetermined thickness and being provided with two holes spaced from one another; an axle movable between a first position in which it extends through said elements so as to pivotally connect the latter with one another, and a second position in which it is withdrawn from said elements so that the latter can be disconnected from one another, said axle having a portion having a cross section which is reduced relative to that of the remainder portion of said axle by a predetermined magnitude; and a substantially V-shaped spring member having a central portion surrounding said axle and two diverging legs located at opposite sides of the latter, said legs of said spring member extending through said holes outwardly beyond said one element and being biased to said one element so as to be retained under the spring action of said spring member, said spring member being movable between one position in which it engages said axle so as to retain the same in said first position thereof for connecting said elements with one another, and another position in which said spring member is disengaged from said axle so that the latter can be moved into its second position, for disconnecting said elements from one another, each of said legs having an end portion which extends outwardly beyond said web of said one element through said holes and has a width which is smaller than that of the remainder portion of said spring member so that a shoulder is formed between each of said end portions and the remainder portion of said spring member, each of said end portions of said legs of said spring member having an outer section located outwardly beyond said one element and bent in a direction away from said axle, each of said outer sections of said end portions of said spring member having an inner surface facing toward said web of said one element, the dimension between the inner surface of the outer portion of one of said legs and the shoulder formed on said one leg being insignificantly greater than said predetermined thickness of said web, the dimension between the inner surface of the outer portion of the other leg of said spring member and the shoulder formed on said other leg being greater than said predetermined thickness of said web of said one element plus said predetermined magnitude by which the cross section of said first-mentioned portion of said axle is reduced relative to that of the remainder portion of said axle.

* * * * *